United States Patent

[11] 3,557,993

| [72] | Inventor | Chester C. DePew<br>Farmingdale, N.Y. |
|---|---|---|
| [21] | Appl. No. | 739,544 |
| [22] | Filed | June 24, 1968 |
| [45] | Patented | Jan. 26, 1971 |
| [73] | Assignee | Tridair Industries<br>Redondo Beach, Calif. |

[54] AIRCRAFT FUEL TANK CLOSURE CAP
3 Claims, 6 Drawing Figs.

[52] U.S. Cl. .................................................. 220/25,
215/40
[51] Int. Cl. .................................................. B65d 45/00,
B65d 41/06
[50] Field of Search ............................................ 220/25, 40

[56] References Cited
UNITED STATES PATENTS

| 3,289,876 | 12/1966 | DePew ............................ | 220/25 |
| 3,343,707 | 9/1967 | DePew et al. .................... | 220/25 |
| 3,391,817 | 7/1968 | Shaw ............................... | 220/25 |

*Primary Examiner*—George T. Hall
*Attorneys*—John P. Chandler, Arthur W. Fuzak and Donald J. Ellingsberg ABSTRACT: An aircraft fuel tank closure cap assembly including a cap with a sealing ring received in an annular recess in the cap, a retaining ring for the sealing ring and a rotatable clamping member with jaws which underlie the fuel tank adapter, and constructed entirely from plastic material.

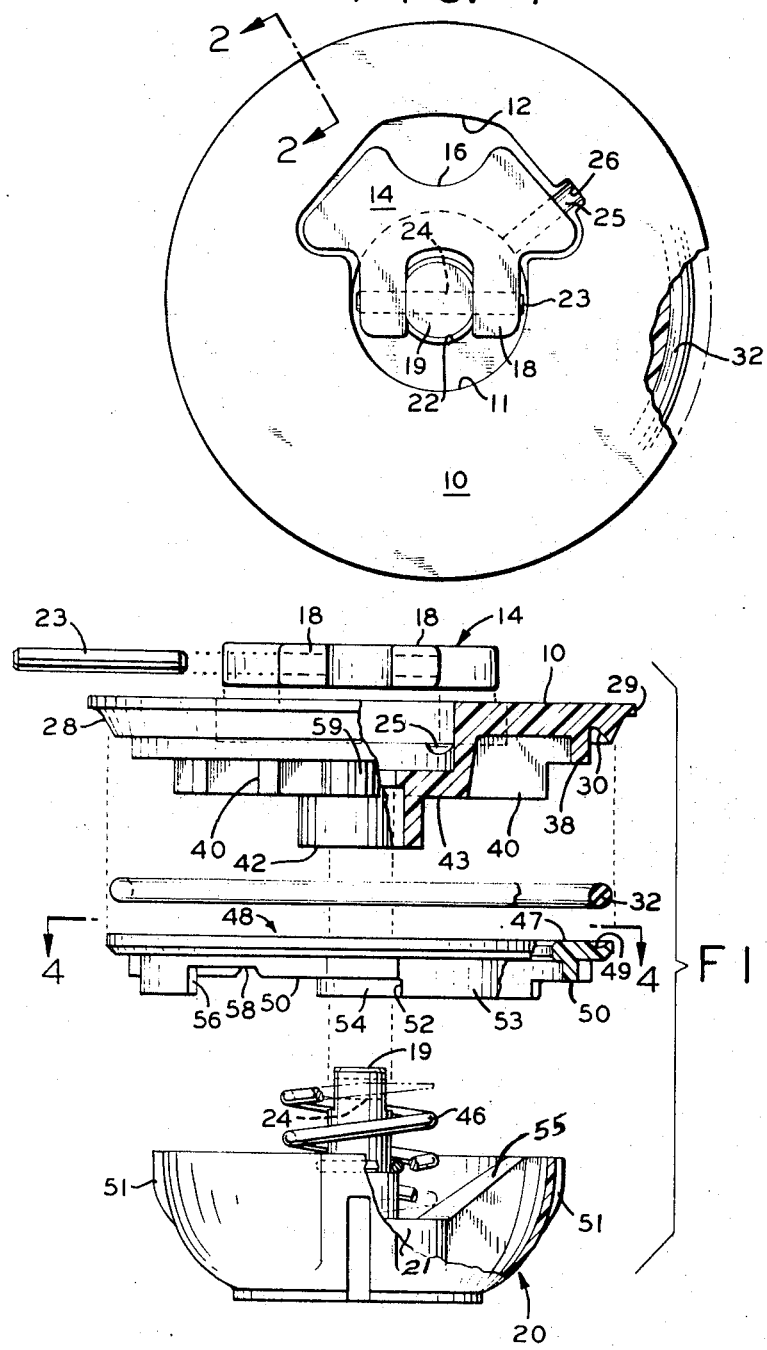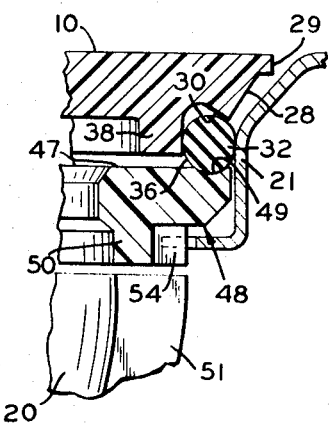

PATENTED JAN 26 1971

INVENTOR.
CHESTER C. DE PEW

BY JOHN P. CHANDLER

HIS ATTORNEY.

AIRCRAFT FUEL TANK CLOSURE CAP

This invention relates to an improved filler cap assembly wherein the critical, normally electrically conducting metallic parts of a conventional cap are constructed wholly of plastic insulating material. An important object of the invention to provide a filler cap having a a greater electrical safety factor than do conventional metallic caps.

A significant danger in aircraft is the possibility that sparks caused by static electricity or lightning will somehow find their way into the fuel tank and this danger is present when an electrical discharge from a conventional metallic closure cap for the fuel tank passes to the metal adapter ring secured to the fuel opening in the tank. There are two major points of possible trouble. If the metallic closure cap were to precisely fit the metal adapter ring and thus establish good electrical contact around its entire periphery, the danger from one source would be lessened. If a positive electrical contact could be made on the inside of the cap between the adapter and the clamping fingers another point of trouble would be eliminated. Normal manufacturing tolerances do not permit such precise construction unless each closure cap were specially constructed to fit only one adapter. Since closure caps must be made to fit all standard adapters, it is inevitable that some gap between the cap and adapter will be present. If the cap is exposed to an electrical potential, this potential must be discharged to the metal adapter ring. If the path of electric discharge is interrupted by an air gap, sparking will result. If this sparking is on the inside of the tank, disaster will be the result. If the electrical discharge is on the outside of the tank, the air under the peripheral margin of the cap becomes ionized, accompanied by the simultaneous development of enormous pressures, which compresses the seal ring used for sealing all such assemblies and permits a blowby of extremely hot gases and sometimes molten metal to discharge past the seal ring and into the interior of the tank. It will be apparent that, if the cap is made of metal, incomplete electrical contact will exist between the clamping jaws of the cup shaped clamping member and the underside of the adapter. Under these conditions, an electrical passage between these contact points will spark causing disastrous results.

Since the closure cap of the present invention is made wholly of plastic insulating material, except for a spring and a pivot pin for the handle, no such discharge can occur because of the absence of conducting paths.

IN the drawing:

FIG. 1 is a plan view of a cap of the present invention;

FIG. 2 is a broken section taken on line 2–2 of FIG. 1 and showing the position of the parts before the clamping plate is rotated to clamping position;

FIG. 3 is an exploded view of the cap structure;

Figure 4:
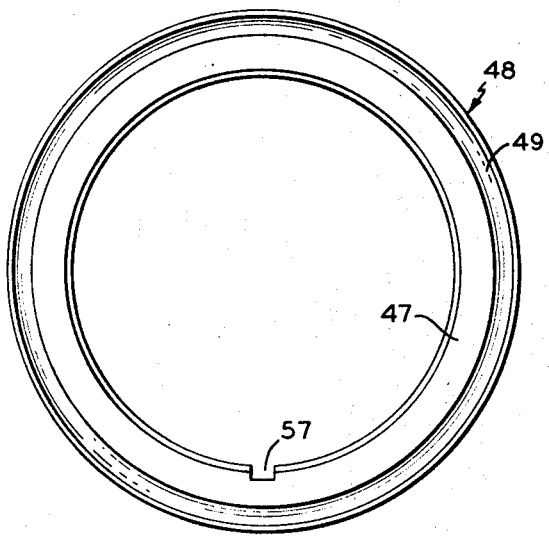
FIG. 4 is a plan view of the retaining ring.

The closure cap 10 shown in FIGS. 1 to 3 is molded from plastic insulating material. It has a recess extending downwardly from its upper surface, the recess including a generally semicircular section 11 on one side and a larger section 12 of irregular shape on the opposite side which has a contour shaped to receive a plastic handle 14. The handle has a finger engaging concave recess 16 at its outer edge. On its opposite side, there are a pair of ears 18 which receive the upper end of a shaft or stud 19 which is formed integrally with a cup shaped clamping member 20 which compresses the sealing ring against the adapter and effects the seal. An enlarged section 21 at the lower end of the stud reinforces the stud and its connection with the clamping member.

The closure cap has a central bearing opening 22 to receive the stud and the handle is pivoted on a pin 23 passing through the ears and through a horizontal bore 24 at the upper end of the stud. To insert the pin, the upper face of recess 12 has a shallow groove 25 extending from the center radially outwardly and terminates in a notch 26 in the wall of larger recess section 12. Thus, when the handle is to be mounted on the stud, the stud is first turned so that the bore 24 is aligned with radial recess 25 and slot 26, the holes in the ears of the handle line up with bore 24 in the stud, and the pin moved into the aligned holes.

The molded closure cap has on its outer periphery a diagonal annular face 28 extending downwardly from an edge section 29, and a V-shaped recess 30 extending inwardly from face 28 and receiving the upper section of a sealing ring 32, said upper section being shaped generally the same as the recess 30. This sealing ring is generally circular in cross section but extends outwardly on its outer surface far enough to engage the corner section 21 of the adapter ring 35. The inner wall 36 of the sealing ring engages an annular flange 38 on the closure cap.

Continuing inwardly from the annular flange 38, there are a number of radial reinforcing ribs 40 which lead to hub 42 and an annular recess 43 outside the hub receives the upper end of a compression spring 46.

The seal ring is maintained within the recess 30 by a separately formed plastic retainer ring 48 having on its upper face 47 a groove 49 to receive and support the lower face of the ring. On its lower face the retainer ring 48 has an annular flange 50.

The clamping member 20 is generally cup shaped and has around its periphery a plurality of clamping jaws 51 which, when the clamping member has been rotated to its maximum counter clockwise position relative to the closure cap, allows the jaws to pass through aligned, (not shown) in adapter ring 21. The jaws pass through these slots and below the adapter, after which the clamping member is rotated to its maximum position in the other direction, and the clamping member is drawn upwardly into clamping relation with the ring. This latter move is effected by moving the handle downwardly to the position of FIG. 1. At its center, the clamping member has a hub 49 with the shaft 10 projecting upwardly from the hub. Relatively deep ribs 55 rigidly connect the hub of the clamping member, and the ribs 55 and jaws 51 are radially aligned, as will be noted from FIG. 3.

The downwardly extending flange 50 is of varying depth and is such as to provide stops 52 formed by a deeper flange section 53. These stops are engaged by the jaws 51 when the operating handle 14 and the clamping member 20 are turned counterclockwise (when viewed from the top) to line up the jaws with the slots in the adapter. The flange is formed with locating lugs 54, one for each clamping jaw 51. These locating lugs lie outside the circle formed by annular flange 50, although the entire retainer ring 48 is cast in one piece. Referring specifically to the locating lug 54 at the center in FIG. 3, one side of said lug, i.e., the side at the right, is aligned with one side of stop 52, i.e., the side at the left, so that when the jaw 51 on the clamping member and the lug 54 are aligned, the two pass through the slot in the adapter. To lock the closure plate, the jaws 51 are lined up with lugs 54 and the jaws pass through the adapter slots and below the same. The handle is now turned in a clockwise direction until the jaws contact stops 56 which are spaced about 30° from stops 52. The handle is now rotated downwardly as aforesaid. On one side of stop 56 is a more shallow flange section 58, adjacent the stop, to permit jaw 51 to move upwardly as far as is necessary to complete the clamping action.

The upper face 47 of ring 48 is indexed and cemented to the lower face of flange 38, after the seal ring is recieved in recess 30 and, in order to effect the correct positioning relative to the closure plate, the ring is formed with an indexing slot 57 (FIG. 4) which receives a narrowed extension 59 of one of the radial strengthening ribs 40.

Figure 6:
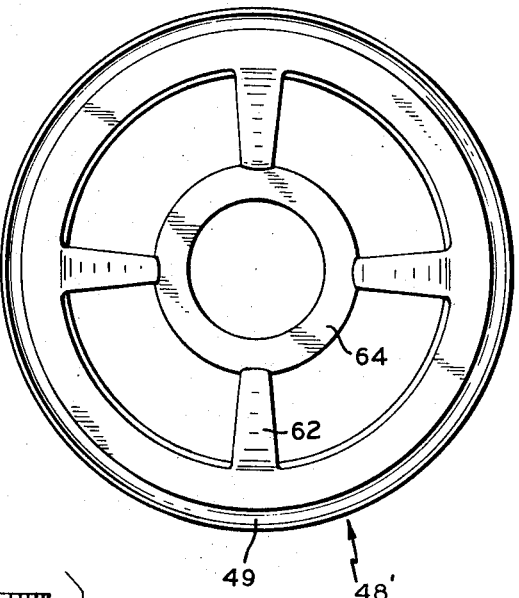
FIG. 6 is a plan view of the modified retaining ring.
Figure 5:
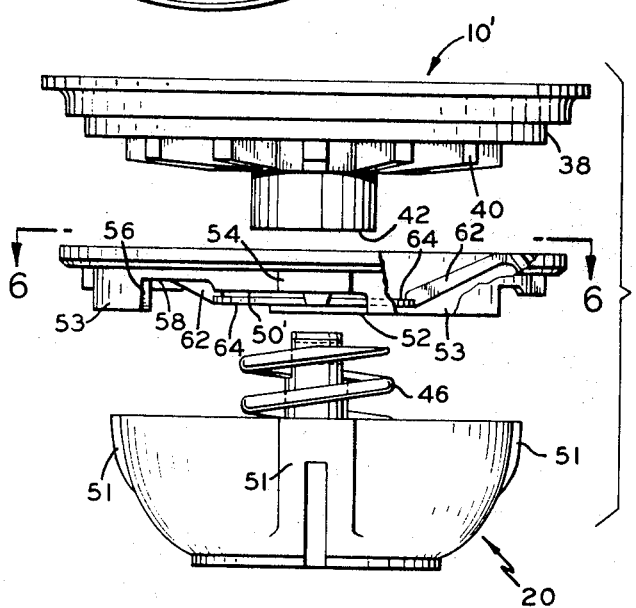
FIG. 5 is an exploded view of an assembly with a modified retaining ring and with the handle omitted.

The modified structure of FIGS. 4, 5 and 6 is substantially the same as that just described except that the retaining ring 48', instead of being cemented in place, is provided with radial supports or spokes 62 which are connected at their inner ends with a downwardly disposed ring or hub portion 64.

While there have been described herein what are at present considered preferred embodiments of the invention, it will be obvious to those skilled in the art that many modificatons and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A closure cap assembly for an aircraft fuel tank provided with a filling opening and an adapter ring with a lower flange having spaced slots therein, secured within said opening, said assembly including a closure cap having a central opening therein, an annular flange on the lower face of the cap and having an annular slot outside the flange, a sealing ring received in said slot, a retaining ring for the sealing ring secured to said flange and provided on its lower face with an annular flange of relatively shallow depth and with deeper sections forming stops, a round generally cup shaped clamping member with spaced jaws around its periphery, a shaft at its center rotatably received in the cap opening, an enlarged centrally disposed hub section with the shaft extending upwardly from said hub section, lugs extending from the clamping member which can be aligned with the adapter slots, ribs extending from said hub section to the outer wall of the clamping member to reinforce the same, the closure cap, the sealing ring, the retaining ring and the clamping member, including the shaft, being formed from plastic insulting material.

2. The structure recited in claim 1 wherein the cap has a recess and a handle to secure the cap in locked relation and received in the recess.

3. The structure recited in claim 1 wherein the jaws are aligned with the lugs when the clamping member is rotated to one extreme position.